(12) United States Patent
Garcia Martinez et al.

(10) Patent No.: US 10,077,215 B2
(45) Date of Patent: Sep. 18, 2018

(54) FERTILIZER HAVING REDUCED BIURET CONTENT

(71) Applicant: SHELL OIL COMPANY, Houston, TX (US)

(72) Inventors: Rafael Alberto Garcia Martinez, Calgary (CA); Cyrille Paul Allais, Amsterdam (NL); Dawid John D'Melo, Bangalore (IN); Chithra Manikandan, Bangalore (IN)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/110,787

(22) PCT Filed: Jan. 7, 2015

(86) PCT No.: PCT/EP2015/050170
§ 371 (c)(1),
(2) Date: Jul. 11, 2016

(87) PCT Pub. No.: WO2015/104293
PCT Pub. Date: Jul. 16, 2015

(65) Prior Publication Data
US 2016/0332924 A1 Nov. 17, 2016

(30) Foreign Application Priority Data
Jan. 9, 2014 (IN) .............................. 114/CHE/2014

(51) Int. Cl.
*C05C 9/00* (2006.01)
*C05D 9/00* (2006.01)
*C05F 11/00* (2006.01)
*C05B 17/00* (2006.01)
*C05G 3/00* (2006.01)

(52) U.S. Cl.
CPC .............. *C05C 9/005* (2013.01); *C05B 17/00* (2013.01); *C05F 11/00* (2013.01); *C05G 3/00* (2013.01); *C05D 9/00* (2013.01)

(58) Field of Classification Search
None
See application file for complete search history.

(56) References Cited

U.S. PATENT DOCUMENTS

| 4,587,358 A | 5/1986 | Blouin |
| 4,676,821 A | 6/1987 | Gullett et al. |
| 5,032,164 A | 7/1991 | Sanford et al. |
| 5,328,497 A | 7/1994 | Hazlett |
| 2005/0204792 A1* | 9/2005 | Kohnke .................... C05C 9/00 71/28 |
| 2009/0019906 A1 | 1/2009 | Leopold |

FOREIGN PATENT DOCUMENTS

| WO | 200500070 | 1/2005 |
| WO | 2013098404 | 7/2013 |
| WO | 2014009326 | 1/2014 |

OTHER PUBLICATIONS

Belgacem; "Industricl Commercial Ligins: Sources, Properties and Applications"; Monomers, Polymers and Composites from Renewable Resources; pp. 225-241; 2008.

* cited by examiner

*Primary Examiner* — Wayne A Langel
(74) *Attorney, Agent, or Firm* — Charles W. Stewart

(57) ABSTRACT

The present invention discloses the use of a lignin compound to prepare a urea fertiliser having reduced biuret content.

8 Claims, No Drawings

FERTILIZER HAVING REDUCED BIURET CONTENT

PRIORITY CLAIM

The present application is the National Stage (§ 371) of International Application No. PCT/EP2015/050170, filed Jan. 7, 2015, which claims priority from Indian Patent Application No. 114/CHE/2014, filed Jan. 9, 2014 incorporated herein by reference.

FIELD OF THE INVENTION

The present invention provides a fertiliser having reduced biuret content.

BACKGROUND OF THE INVENTION

Urea is commonly used as a fertiliser, supplying nitrogen to plants. Biuret is a phytotoxin (a material that is toxic to plants) and is formed as an impurity during the production of urea fertilisers. Biuret interferes with nitrogen metabolism and protein synthesis in plants.

It is desirable to reduce the amount of biuret in fertilisers. US 2009 019906 discloses a process for producing urea fertilisers wherein a centrigual pump is employed. The use of the pump allows for the use of shorter pipelines, thereby decreasing the residence time and reducing biuret formation during urea synthesis.

The present inventors have sought to prepare a urea fertiliser having reduced biuret concentration.

SUMMARY OF THE INVENTION

Accordingly, the present invention provides the use of a lignin compound to prepare a urea fertiliser having reduced biuret content.

It is known to incorporate lignin compounds into urea fertilisers to improve the physical properties of the fertiliser, e.g. as described in U.S. Pat. No. 4,676,821. However, the present inventors have advantageously recognised that lignin compounds can be used to reduce biuret content in urea fertilisers. The inventors believe that the presence of a lignin compound during the production of urea fertilisers can reduce the formation of biuret, particularly when the components are present in an amount of from 50 to 99.9 wt % urea and from 0.01 to 0.25 wt % of a lignin compound.

DETAILED DESCRIPTION OF THE INVENTION

In the present invention, a lignin compound is incorporated into a urea fertiliser. The lignin compound is suitably a lignosulphonate. Examples of lignosulphonates include ammonium lignosulphonate, sodium lignosulphonate, calcium lignosulphonate and potassium lignosulphonate. Preferably, the lignosulphonate is calcium lignosulphonate.

Lignin compounds are derived from lignin, which is found in the cellular material of plants, e.g. trees.

Lignins comprise polymeric propylphenol substituted moieties which are interconnected at various positions on the carbon skeleton through a phenoxy group. Lignosulphonate may be produced from lignin by a sulphite process, in which suitable feedstock such as wood is digested at 140-170° C. with an aqueous solution of calcium bisulphite in acidic conditions. A benzylic cation is formed under the stated conditions, which is quenched by the sulphite ion to produce a sulphonated derivative which is separated.

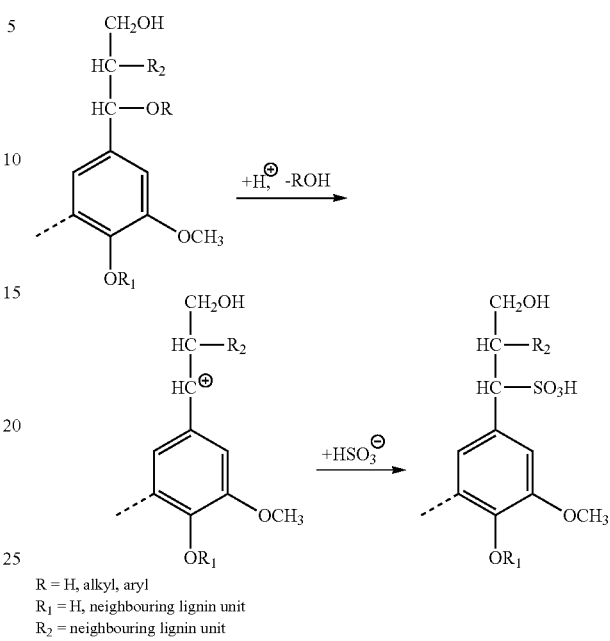

R = H, alkyl, aryl
$R_1$ = H, neighbouring lignin unit
$R_2$ = neighbouring lignin unit Details of this process are described, for example, in Monomers, Polymers and Composites from Renewable Resources; M. N. Belgacem, A. Gandini; Elsevier, 2008, 225-241.

Depending on the nature of the reaction conditions the lignosulphonate produced can contain carbohydrate components which are chemically linked to the lignosulphonate molecular framework. This material finds commercial applications as sugared lignosulphonate, which may for example have a carbohydrate content as high as 35 wt % depending on manufacturing conditions. Alcoholic fermentation of a sugared lignosulphonate mixture or selective chemical treatment by ultrafiltration can be used to remove sugar content to produce a de-sugared calcium lignosulphonate.

Lignosulphonates useful as in the present invention may be sugared lignosulphonates or de-sugared lignosulphonates and may be derived from softwood or hardwood feedstocks.

For example, sugared lignosulphonates derived from hardwood and de-sugared lignosulphonates derived from softwood have been found to be of particular use.

Preferably, the carbohydrate content of the lignosulphonates, as determined by TAPPI test method T 249 cm-85 (involves an acid treatment followed by gas chromatography analysis), may be at most 35 wt %, more preferably at most 15 wt %, even more preferably at most 5 wt %.

The molecular weight of the lignosulphonate may vary considerably and may be, for example, in the range of from 7000 to 35000 Daltons, preferably 12,000 to 28,000 Daltons.

The term lignosulphonate also encompasses mixed salts of different ions such as potassium/sodium lignosulphonate or potassium/calcium lignosulphonate.

The amount of lignin compound in the fertiliser is suitably at least 0.01 wt % based upon the weight of the urea fertiliser composition. The amount of lignin compound is suitably less than 1 wt %, more preferably less than 0.5 wt % and most preferably less than 0.25 wt %.

The amount of urea in the fertiliser is suitably at least 50 wt % based upon the weight of the urea fertiliser composition. The amount of urea is suitably less than 99.9 wt %.

In a preferred embodiment the urea fertiliser is a urea-sulphur fertiliser, comprising both urea and elemental sulphur. The elemental sulphur in the urea-sulphur fertiliser may be high purity (>99.9% S) chemical sulphur as obtained from the Claus process. However, elemental sulphur of significantly lower purity can also be used. Examples of such elemental sulphur are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur, with the balance comprising lime, gypsum, silica, iron and other trace materials.

The amount of elemental sulphur in the fertiliser is suitably at least 5 wt % based upon the weight of the urea-sulphur fertiliser composition. The amount of sulphur is suitably less than 60 wt %, more preferably less than 50 wt % and most preferably less than 40 wt %.

The preferred amount of lignin compound is a balance between minimising cost (and therefore minimising the amount of lignin compound) and achieving sufficient reduction of biuret content.

When the fertiliser comprises both urea and sulphur, the urea and sulphur are suitably homogeneously dispersed throughout the fertiliser. It is not desirable that the sulphur is coated onto the surface of the urea. The lignin compound is suitably homogeneously dispersed throughout the urea fertiliser.

The urea fertiliser may comprise additional plant nutrients. Such plant nutrients may be selected, but not limited to potassium, phosphorus, nitrogen, boron, selenium, sodium, zinc, manganese, iron, copper, molybdenum, cobalt, calcium, magnesium and combinations thereof. These nutrients may be supplied in elemental form or in the form of salts such as oxides, hydroxides, sulphates, nitrates, halides or phosphates. The amount of additional plant micronutrients depends on the type of fertiliser needed and is typically in the range of from 0.1 to 30 wt %, based on the total weight of the fertiliser, preferably in the range of from 0.5 to 20 wt %.

The urea fertiliser may be made by a process wherein a stream which comprises liquid urea is mixed with a lignin compound, and the liquid is formed into fertiliser particles.

In the preferred embodiment wherein the fertiliser is a urea-sulphur fertiliser, the fertiliser may be made by a process comprising steps of:
(a) providing a first stream which comprises liquid urea;
(b) providing a second stream comprising liquid elemental sulphur;
(c) mixing the first stream and the second stream in a mixing device in the presence of a lignin compound to form an emulsion comprising micro-encapsulated elemental sulphur particles which are coated with a layer of the lignin compound, whereby a temperature is applied of more than 135° C. which maintains the elemental sulphur and the urea substantially in the liquid form in the mixing device; and
(d) subjecting the emulsion as obtained in step (c) to one or more further processing steps to obtain the urea-sulphur fertiliser.

In step (c) use is made of a mixing device. The mixing device to be used in step (c) can suitably be a dispersion mill wherein a rotor turns within a slotted stator or a static mixer. Preferably, the mixing device is a dispersion mill.

In step (c) one or more additional plant nutrients can be added and/or a defoamer may be added.

In step (d) the emulsion as obtained in step (c) is subjected to one or more further processing steps to obtain the urea-sulphur fertiliser. The one or more further processing steps comprise subjecting the emulsion to a forming process to obtain the urea-sulphur fertiliser. The forming process can suitably be a granulating process, a prilling process, a compaction process, a tablet forming process, or a compressing process.

The emulsion of elemental sulphur particles as obtained in step (c) can be combined with one or more further components to obtain a mixture of the emulsion and the one or more further components, and this can be subjected to a forming process in step (d). The one or more further components could be other fertiliser products. For example, phosphate rock could be added to the emulsion of elemental sulphur particles before it is supplied to the forming process in step (d), thereby providing a urea-sulphur-phosphate rock fertiliser. Alternatively, potassium chloride could be added to the emulsion of elemental sulphur particles before it is supplied to the forming process in step (d), thereby providing a urea-sulphur-KCl fertiliser. In one embodiment, phosphoric acid could be could be added to the emulsion of elemental sulphur particles whilst it is hot and before it is supplied to the forming process in step (d). The phosphoric acid would react with the urea, thereby providing a urea-phosphate-sulphur fertiliser. In another embodiment, the urea-sulphur emulsion or the formed urea-sulphur fertiliser can be combined with NPK fertilisers, either by adding the urea-sulphur emulsion into the NPK fertiliser production process (prior to the forming of the fertiliser) or by blending granules of urea-sulphur fertiliser with granules of NPK fertiliser.

Another material that could be incorporated into the urea-sulphur fertiliser is a clay such as bentonite. Suitably the clay could be added to the emulsion of elemental sulphur particles before it is supplied to the forming process in step (d).

Suitably the amount of biuret in the urea fertiliser is less than 1.5 wt %, based upon the weight of the urea fertiliser, more preferably less than 1 wt % and most preferably less than 0.75 wt %.

The present invention enables the skilled person to prepare a urea fertiliser having reduced biuret content, i.e. the skilled person can prepare a fertiliser that has a lower biuret content than a fertiliser that is otherwise the same but does not comprise the lignin compound. Biuret content may be measured using the IFDC method: Biuret-Spectrophotometric TSU-AL AP-1002, 2002.

An experiment was carried out to demonstrate that a lignin compound can be used to reduce biuret content in urea.

EXPERIMENT

Three mixtures of molten urea and molten sulphur were maintained at temperatures of 135-145° C. for extended periods of time until significant biuret concentration had developed. The biuret content of the mixtures was measured and commercial calcium lignosulphonate (50% w/w), was added to the mixture to yield a final concentration of 0.1% w/w of calcium lignosulphonate on total weight. Measurements of the biuret content of the mixture before and after the addition of the calcium lignosulphonate were taken and are shown in Table 1.

TABLE 1

| | Biuret concentration (%) | |
| --- | --- | --- |
| | Before addition of Calcium Lignosulphonate | After addition of Calcium Lignosulphonate |
| Mixture 1 | 8.80% | 7.80% |
| Mixture 2 | 27.90% | 20.30% |
| Mixture 3 | 13.20% | 14.40% |

For mixtures 1 and 2 the addition of calcium lignosulphonate led to a reduction in the biuret concentration. For mixture 3, this was not the case.

That which is claimed is:

1. A method comprising:
incorporating a lignin compound into a urea fertilizer to provide for a reduced biuret content in the urea fertilizer;
wherein the urea fertilizer comprises sulphur particles; and
wherein the sulphur particles are coated with a layer of the lignin compound.

2. The The method according to claim 1, wherein the biuret content of the fertilizer is less than 1.5 wt %, based upon the weight of the urea fertilizer.

3. The method according to claim 2, wherein the lignin compound is a lignosulphonate.

4. The method according to claim 3, wherein the lignin compound is calcium lignosulphonate.

5. The method according to claim 4, wherein the lignin compound is present in amount of at least 0.01 wt % based upon the weight of the urea fertilizer.

6. The method according to claim 5, wherein the lignin compound is present in amount of less than 1 wt % based upon the weight of the urea fertilizer.

7. The method according to claim 6, wherein the urea fertilizer comprises from 5 to 60 wt % elemental sulphur, based upon the weight of the urea fertilizer.

8. The method according to claim 7, wherein the urea fertilizer comprises an additional fertilizer selected from the group consisting of potassium, phosphorus, nitrogen, boron, selenium, sodium, zinc, manganese, iron, copper, molybdenum, cobalt, calcium, magnesium and combinations thereof.

* * * * *